Aug. 25, 1942.  F. H. METZGER  2,294,194
DISTRIBUTING MECHANISM
Original Filed May 19, 1937  2 Sheets-Sheet 1
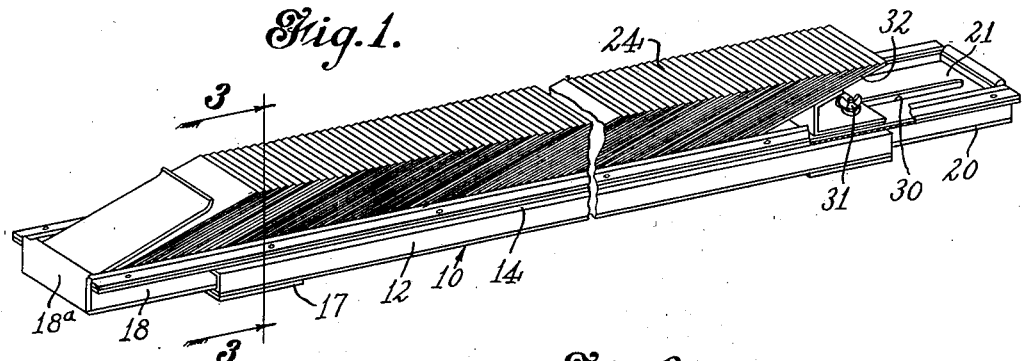
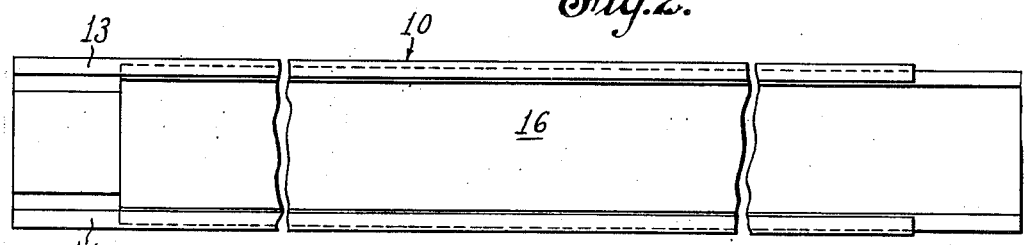
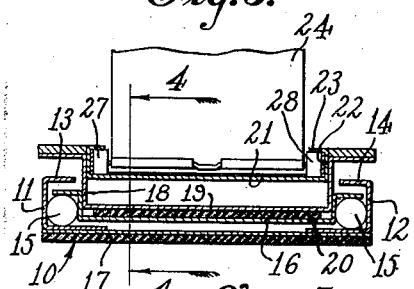
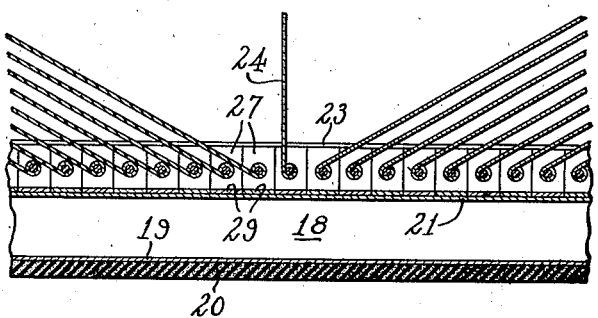
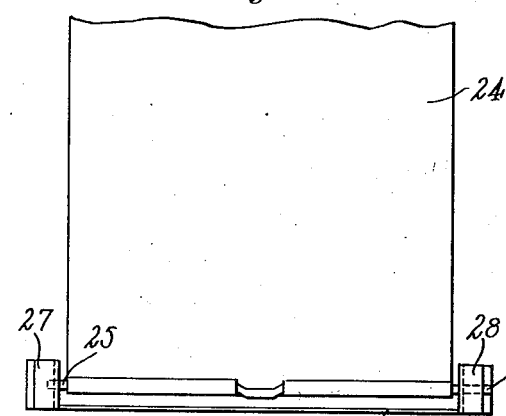
Inventor
Frank H. Metzger
By Rockwell Bancholow
Attorneys Aug. 25, 1942.   F. H. METZGER   2,294,194
DISTRIBUTING MECHANISM
Original Filed May 19, 1937   2 Sheets—Sheet 2

Patented Aug. 25, 1942

2,294,194

UNITED STATES PATENT OFFICE 2,294,194

DISTRIBUTING MECHANISM

Frank H. Metzger, Mountain Lakes, N. J., assignor to Sorting Methods & Equipment Co., Incorporated, New York, N. Y., a corporation of New York Original application May 19, 1937, Serial No. 143,457. Divided and this application December 2, 1940, Serial No. 368,111

5 Claims. (Cl. 129—15)

This application is a division of my application, Serial No. 143,457, filed May 19, 1937, since matured into Patent No. 2,231,633, dated February 11, 1941, and the invention relates to a distributing or sorting mechanism, and more particularly to a device adapted to assist in distributing or sorting cards, sales tickets, papers, correspondence, etc., preparatory to filing of such members.

In general the device comprises a movable carriage having supported thereon a plurality of leaves hinged on horizontal axes extending transversely of the carriage, so that these leaves may swing about their axes and be supported by members at the ends of the carriage in inclined overlapping relation. It will, of course, be understood that owing to the spaced position of the lower portions of the leaves in the carriage, the upper edges of each leaf will be exposed so that indicia thereon may be visible to the user.

The user may, by grasping any particular leaf, raise this leaf, together with all those in front or behind it, as the occasion may be, so as to slip a member to be filed, such as a card, sales slip or letter, between such leaf and the next adjacent one. The carriage upon which the leaves are supported is movably mounted upon a support, so that the device may be made of any desired length and may be moved back and forth to enable the user to reach easily all of the leaves without changing position.

One object of the invention is the provision in a distributor of the character described of means for hingedly supporting a plurality of leaves such that the leaves may be supported, not only for pivotal movement, but also for longitudinal movement with relation to the base or support, whereby additional leaves may be readily inserted between leaves already mounted in the support without the necessity of removing all of the leaves from the support.

A still further object of the invention is the provision of novel means for securing the movable leaves to a support such that they may be readily adjusted, removed or replaced.

A still further object of the invention is the provision of a hinge base member or movable support for the leaves, which may also serve as a spacing member to space apart two adjacent leaves if desired.

To these and other ends the invention consists in the novel features and combinations of parts to be hereinafter described and claimed.

In the drawings:

Fig. 1 is a perspective view of a distributing or sorting mechanism embodying my invention;

Fig. 2 is a plan view of the supporting member and carriage of the device, the tray containing the movable leaves having been removed;

Fig. 3 is a transverse sectional view of the complete device on line 3—3 of Fig. 1;

Fig. 4 is a partial longitudinal sectional view on line 4—4 of Fig. 3;

Fig. 5 is a partial front view of one of the detachable leaves, together with the hinge base or support for the same.

Figure 6:
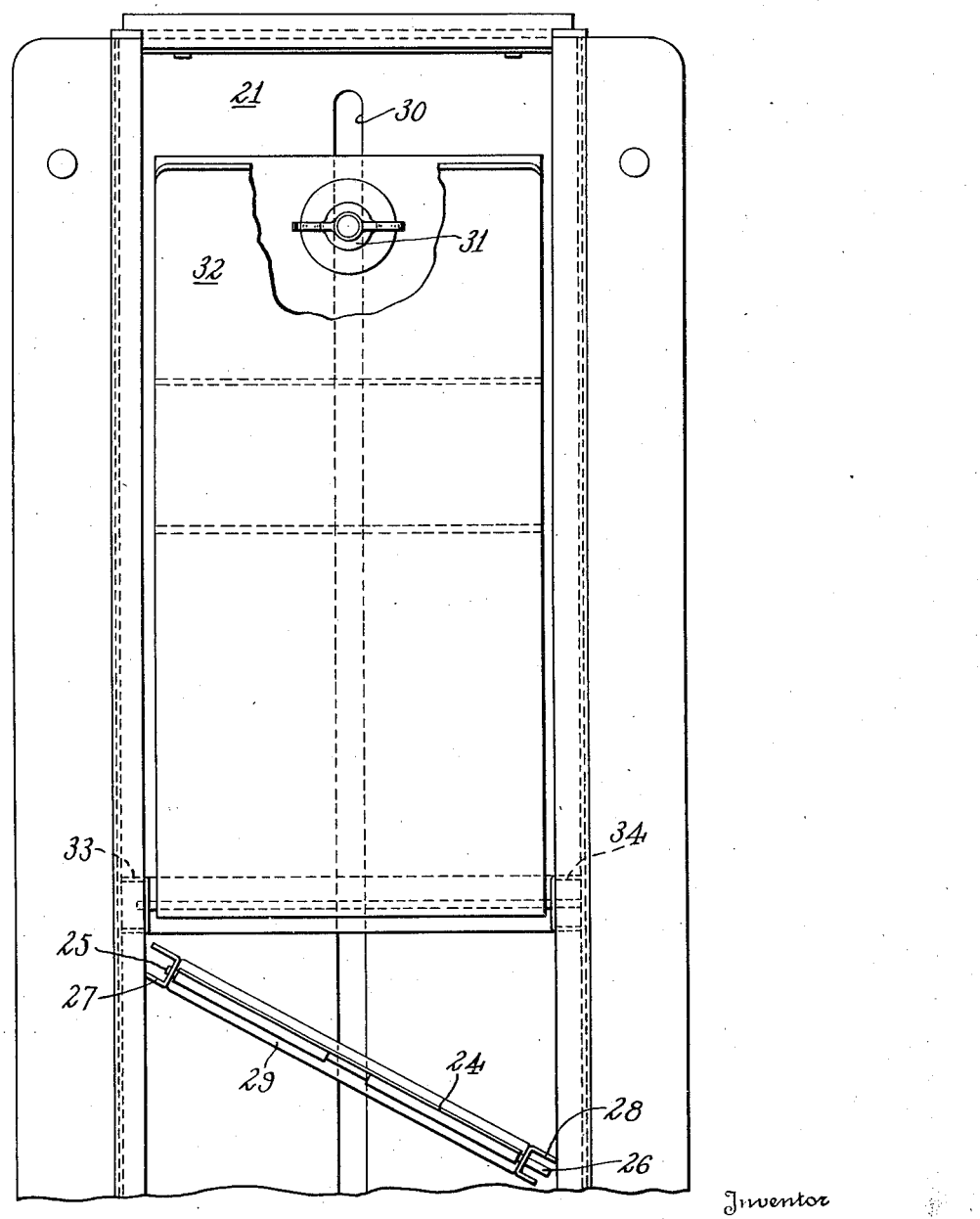
Fig. 6 is a plan view of the tray for supporting the leaves, some parts being broken away for the sake of clearness.

To illustrate a preferred embodiment of my invention, I have shown a supporting member 10 having upstanding side members 11 and 12, at the top of which are inwardly extending flanges 13 and 14 overlying the supporting member 10 and forming therewith channels or ways within which are adapted to ride freely movable rollers 15 which slidably support a carriage member 16. This carriage member, as shown in Figs. 2 and 3, is substantially tray-shaped in form, and is adapted in turn to support the distributing device, as will be hereinafter explained.

The base or supporting member 10 may be provided with rubber pads 17 at spaced portions, so that it may be placed upon a desk or the like without marring the latter or without likelihood of movement when the device is operated.

The distributing mechanism comprises a tray 18 which, as shown in Fig. 3, may be seated in and rest upon the carriage 16. Upon the bottom portion 19 of this tray may be secured a strip of rubber or similar friction material 20, so that the tray will cling to the carriage and move therewith when the carriage is moved with respect to the base upon the rollers 15. The tray 18 is provided with a false bottom 21 having at its ends upstanding sides 22 provided with inturned flanges 23 which form guideways with the bottom portion 21. It will be understood that these are parallel longitudinally extending guideways formed at opposite sides of the tray and facing each other.

These guideways form means for retaining the hinged leaves upon the tray, as will now be explained.

The leaves are shown in Figs. 4 and 5, and each comprises a thin resilient plate or leaf of sheet metal 24, the lower part of the sheet being wrapped or folded over a rod whose projecting ends form hinge pintles 25 and 26. These hinge pintles are adapted to be inserted in perforations in upstanding members 27 and 28 formed at each end of a connecting strip 29. The strip 29 and side members 27 and 28, which, as shown in Fig. 6, are of channel shape in horizontal cross section, form a hinge support or base for the leaf, the side members 27 and 28 being slidably mounted in the ways formed at each side of the false bottom 21 of the tray or support 18.

It will be noted that the pintle 25 is shorter than the pintle 26, and the upstanding channel-shaped members 27 and 28 may be sprung outwardly sufficiently to permit the detaching of the short end 25 from the member 27, so as to remove the leaf from the hinge support or base member 29, if desired. In this case the hinge support or base member, comprising the strip 29 and side members 27 and 28, may be used in the device as spacers to space apart two adjacent leaves, if desired. When no spacing between adjacent leaves is desired, the members may be arranged as shown in Fig. 4, whereas the end members 27 and 28 of the leaves abut each other in the channels or ways in which they are slidably mounted.

At its front end the tray or support 18 is closed, as shown at 18ª, so as to close the ways formed by the members 23 and prevent the hinge base members from sliding out of the tray. At the other end of the device, the false bottom 21 is provided with a slot 30 within which slides a thumb screw 31 attached to an inclined support 32 slidably resting on the bottom member 21, and having laterally projecting members 33 and 34 projecting into the ways to hold the members 27 and 28 in position.

As shown in Fig. 6, if it is desired to remove any of the leaves from the device, it is only necessary to loosen the thumb screw 31 and slide the member 32 rearwardly, so that the hinge base members may be swung angularly with respect to the base 19, whereby the end members 27 and 28 are withdrawn from the channels. The reverse procedure is, of course, followed when it is desired to insert a new leaf into the tray. It will be apparent that, as the leaves are slidably mounted in the ways or channels of the tray, as well as pivotally mounted therein, a new leaf may be inserted at any desired space merely by loosening the thumb screw 31 and moving rearwardly the member 32, then opening up a space at the desired point by merely sliding all of the leaves rearwardly. It is not necessary to remove any of the leaves or the hinge base members from the tray in order to insert new leaves at any desired place. Similarly, a leaf may be removed, if desired, without leaving any blank space, as when the hinge base member has been removed from the channel, the remaining leaves may be moved toward each other into compact abutting position, as shown in Fig. 4.

It will be apparent that the distributor shown herein is capable of a wide variety of uses, and, moreover, is designed to give long and efficient service. The leaves, as stated, are made of highly flexible sheet metal, and are much superior to those made of fibre. Moreover, the manner in which the leaves are slidably supported in the tray is such that they may be placed or held in compact relation, but at the same time may be moved apart in order that one or more may be removed from the tray individually, and it is, therefore, unnecessary when inserting a new leaf to remove all of the leaves from the support on one side or the other of the position in which it is desired to place the new one. In addition, the sliding supports to which the leaves are hinged may be readily detached from the leaves and used as spacer members to space the leaves apart when desired.

Moreover, it will be noted that the upstanding members 27 and 28 are formed integrally with the base or connecting strip 29, and the outwardly directed flange portions of these members, which make them channel-shaped in cross section, are integral with the end members themselves, as they are integral portions of these members turned outwardly to form the flanges. These flanges give a firm slidable bearing for the leaf-supporting members in the ways formed at each side of the false bottom 21 of the tray or support 18, so that when the members are in position there will be little or no lost motion or play between them.

While I have shown and described a preferred embodiment of my invention, it will be understood that it is not to be limited to all of the details shown, but is capable of modification and variation within the spirit of the invention and within the scope of the appended claims.

What I claim is:

1. In a distributing device, a movable support having in-turned flanges at its upper edges to provide longitudinally extending opposed parallel guideways, hinge elements having upstanding end portions slidably mounted in said guideways, and a base strip connecting said end portions, leaves hinged to said end portions to swing about an axis transverse to the guideways, means for holding said hinge elements against movement in said guideways and in close juxtaposed position therein, and said end portions being resilient to be sprung outwardly on said strip to permit detachment of the leaves therefrom and having transversely extending side flanges of substantial width to abut those of adjacent elements.

2. In a distributing device, a support having longitudinally extending guideways, hinge elements slidably mounted on said support, leaves hinged to said elements to swing about an axis transverse to the direction of the sliding movement thereof, means to hold said elements in juxtaposed relation, and spacer elements insertable between said hinge elements to space apart said leaves, said spacer elements each comprising a base strip and upstanding, outwardly facing channel-shaped end portions slidably mounted in said guideways, said portions having vertically extending relatively wide flanges abutting the adjacent hinge elements.

3. A leaf for a distributing device comprising a thin flexible sheet metal plate, a pivot member extending transversely of and secured to the leaf at its lower end and projecting from the edges of the leaf, a base member extending transversely below the leaf and having end portions upstanding vertically therefrom having outwardly directed side flanges, said portions being provided with openings to receive the projecting ends of the pivot member and being flexible with respect to the base member whereby they may be spread apart to insert the pivot pins in said openings.

4. A leaf for a distributing device comprising a thin flexible sheet metal plate, a pivot member extending transversely of and secured to the leaf at its lower end and projecting from the edges of the leaf, a base member extending transversely below the leaf and having end portions upstanding vertically therefrom, said portions being provided with openings to receive the projecting ends of the pivot member and being flexible with respect to the base member whereby they may be spread apart to insert the pivot pins in said openings, and said upstanding end portions having relatively wide side flanges so as to be channel-shaped in cross section, with the channel opening facing outwardly to house the projecting ends of the pivot between the side flanges thereof.

5. A leaf for a distributing device comprising a thin flexible sheet metal plate, a pivot member extending transversely of and secured to the leaf at its lower end and projecting from the edges of the leaf, a base member extending transversely below the leaf and having end portions upstanding vertically therefrom, said portions being provided with openings to receive the projecting ends of the pivot member and being flexible with respect to the base member whereby they may be spread apart to insert the pivot pins in said openings, and said end portions having outwardly projecting vertically extending bearing flanges at each edge thereof to provide end portions of substantial depth.

FRANK H. METZGER.